(12) United States Patent
Hwang et al.

(10) Patent No.: US 7,729,056 B2
(45) Date of Patent: Jun. 1, 2010

(54) LIGHT-CONDENSING MEMBER, METHOD OF MANUFACTURING THE SAME AND DISPLAY APPARATUS HAVING THE SAME

(75) Inventors: Seong-Yong Hwang, Yongin-si (KR); Sang-Yu Lee, Yongin-si (KR); In-Sun Hwang, Suwon-si (KR); Joong-Hyun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/511,959

(22) Filed: Aug. 29, 2006

(65) Prior Publication Data

US 2007/0058259 A1 Mar. 15, 2007

(30) Foreign Application Priority Data

Sep. 13, 2005 (KR) ...................... 10-2005-0085287

(51) Int. Cl.
*G02B 27/10* (2006.01)
*G03B 21/60* (2006.01)

(52) U.S. Cl. ...................................... 359/625; 359/454

(58) Field of Classification Search ................. 359/625, 359/454, 455, 708, 718
See application file for complete search history.

(56) References Cited

U.S. PATENT DOCUMENTS

| | | | | |
|---|---|---|---|---|
| 5,817,396 A | * | 10/1998 | Perlo et al. | 428/141 |
| 6,545,827 B1 | * | 4/2003 | Okabe et al. | 359/837 |
| 7,180,690 B2 | * | 2/2007 | Nagao | 359/837 |

* cited by examiner

*Primary Examiner*—Alicia M Harrington
(74) *Attorney, Agent, or Firm*—F. Chau & Associates, LLC

(57) ABSTRACT

A light-condensing member includes a base plate, a main light-condensing pattern formed on the base plate, and a sub light-condensing pattern formed on the main light-condensing pattern. The main light-condensing pattern includes a plurality of main prisms extended in a first direction. A cross section of a main prism taken along a second direction substantially perpendicular to the first direction has a substantially triangular shape. The sub light-condensing pattern includes a plurality of sub prisms formed on the main prisms and extended in a second direction substantially perpendicular to the first direction. A cross section of a sub prism taken along the first direction has a substantially triangular shape. Since light is condensed simultaneously in both a horizontal direction and a vertical direction through one light-condensing member, manufacturing costs and the thickness of backlight assembly are reduced.

13 Claims, 11 Drawing Sheets

LIGHT-CONDENSING MEMBER, METHOD OF MANUFACTURING THE SAME AND DISPLAY APPARATUS HAVING THE SAME

CROSS-REFERENCE TO RELATED APPLICATIONS

This application claims priority to Korean Patent Application No. 2005-85287 filed on Sep. 13, 2005, the contents of which are herein incorporated by reference in their entirety.

BACKGROUND OF THE INVENTION

1. Technical Field

The present disclosure relates to a light-condensing member capable of reducing a manufacturing cost and a thickness by reducing the number of elements, a method of manufacturing the light-condensing member and a display apparatus having the light-condensing member.

2. Discussion of the Related Art

A display apparatus may be employed by information-processing devices such as a notebook computer, a monitor, and a terminal of mobile communication. Various kinds of apparatuses, such as a cathode ray tube (CRT), and a plasma display panel (PDP) may be used as a display apparatus. However, a liquid crystal display apparatus (LCD), which uses a liquid crystal to display images, has been widely used as a display apparatus.

The liquid crystal display apparatus displays images by using liquid crystal, which has optical and electrical properties such as an anisotropic refractive index, and an anisotropic permittivity. When compared with other display apparatuses such as CRTs, and PDPs, the liquid crystal display apparatus is thinner, lighter, uses less driving voltage, and consumes less power.

The liquid crystal display apparatus includes a liquid crystal display panel. The liquid crystal display panel has a liquid crystal layer disposed between two substrates, for example, a lower substrate and an upper substrate. The liquid crystal display panel displays images by changing light transmittance caused by changing the alignment of liquid crystal molecules of the liquid crystal layer.

The liquid crystal display panel is non-emissive device that does not emit light. Therefore, the liquid crystal display apparatus employs a backlight assembly to provide the liquid crystal display panel with light.

A conventional backlight assembly may include a lamp emitting light, and a light guide plate guiding a path of the light. The light, which is provided from the lamp disposed at a side of the light guide plate, is guided by the light guide plate toward a liquid crystal display panel disposed over the backlight assembly.

The backlight assembly may further include a plurality of light-condensing sheets disposed over the light guide plate to condense light exiting from the light guide plate. The light-condensing sheets may include a first light-condensing sheet to condense light along a first direction, and a second light-condensing sheet to condense light along a second direction that is substantially perpendicular to the first direction.

The use of two of light-condensing sheets to condense light simultaneously in the first and second directions increases the manufacturing cost and a thickness of the display products.

SUMMARY OF THE INVENTION

Embodiments of the present invention provide a single light-condensing member condensing light simultaneously in the first and second directions, which reduces the manufacturing cost and the thickness of products, a method of manufacturing the light-condensing member, and a display apparatus having the light-condensing member.

A light-condensing member according to an example embodiment of the present invention, includes a base plate, a main light-condensing pattern formed on the base plate, and a sub light-condensing pattern formed on the main light-condensing pattern.

The main light-condensing pattern includes a plurality of main prisms extended in a first direction. A cross section of the main prism taken along a second direction substantially perpendicular to the first direction has a substantially triangular shape.

The sub light-condensing pattern includes a plurality of sub prisms formed on the main prisms and extended in a second direction substantially perpendicular to the first direction. A cross section of the sub prism taken along the first direction has a substantially triangular shape.

In a method of manufacturing the light-condensing member according to an example embodiment of the present invention, a master mold having a shape corresponding to a main light-condensing pattern and a sub light-condensing pattern is formed. The master mold is coated with a release agent. A stamper is formed by electroplating the master mold coated with the release agent. Then, the main light-condensing pattern and the sub light-condensing pattern are formed on a base plate including a resinous material by using the stamper.

The master mold may be formed by forming a shape corresponding to the main light-condensing pattern on the base plate by using a first mask having a first opening pattern corresponding to the main light-condensing pattern, and by forming a shape corresponding to the sub light-condensing pattern on the base plate including the shape corresponding to the main light condensing pattern, by using a second mask having a second opening pattern corresponding to the sub light-condensing pattern.

A display apparatus according to an example embodiment of the present invention, includes a lamp emitting light, a light guide plate guiding light provided from the lamp toward an upper part of the display apparatus, wherein the lamp is disposed at a side portion of the light guide plate, a light-condensing member disposed over the light guide plate to condense light exiting from the light guide plate, and a display unit disposed over the light-condensing member to display an image using the condensed light. The light-condensing member includes a base plate, a main light-condensing pattern formed on the base plate, and a sub light-condensing pattern formed on the main light-condensing pattern.

A display apparatus according to another example embodiment of the present invention, includes a lamp emitting light, a light-condensing member to condense and emit light provided from the lamp, wherein the lamp is disposed at a side portion of the light-condensing member, and a display unit disposed over the light-condensing member to display an image using the condensed light. The light-condensing member includes a base plate, a main light-condensing pattern formed on the base plate, and a sub light-condensing pattern formed on the main light-condensing pattern.

According to the exemplary embodiments of the present invention, condensing light in both a horizontal direction and a vertical direction is simultaneously performed through one light-condensing member. Therefore, it is possible to cut down manufacturing costs and to reduce the thickness of products.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF THE EXEMPLARY EMBODIMENTS

Exemplary embodiments of the present invention will now be described more fully hereinafter below in more detail with reference to the accompanying drawings. This invention may, however, be embodied in many different forms and should not be construed as limited to the embodiments set forth herein. Hereinafter, embodiments of the present invention will be explained in detail with reference to the accompanying drawings.

Figure 1:
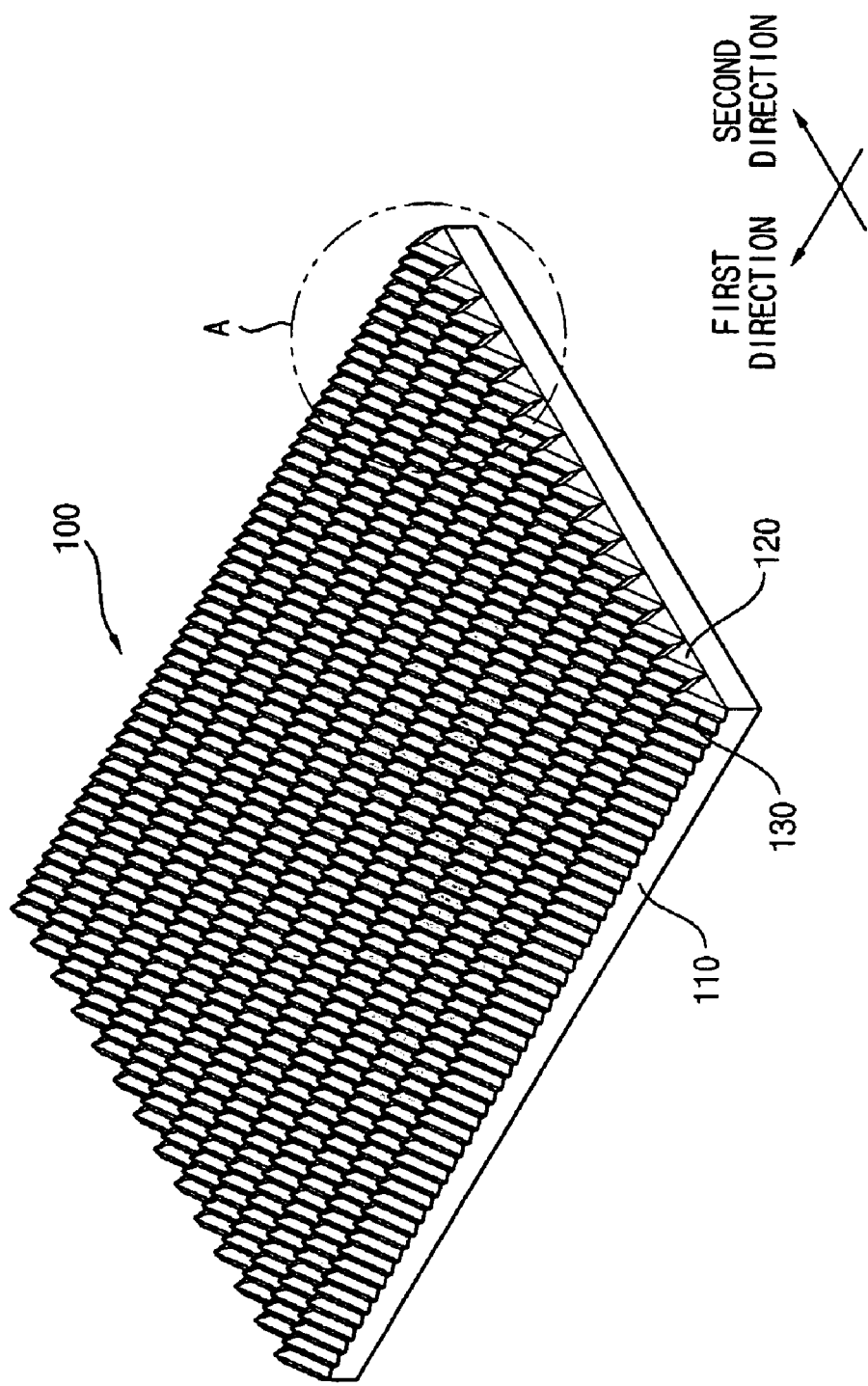
FIG. 1 is a perspective view showing a light-condensing member according to an example embodiment of the present invention.
Figure 2:
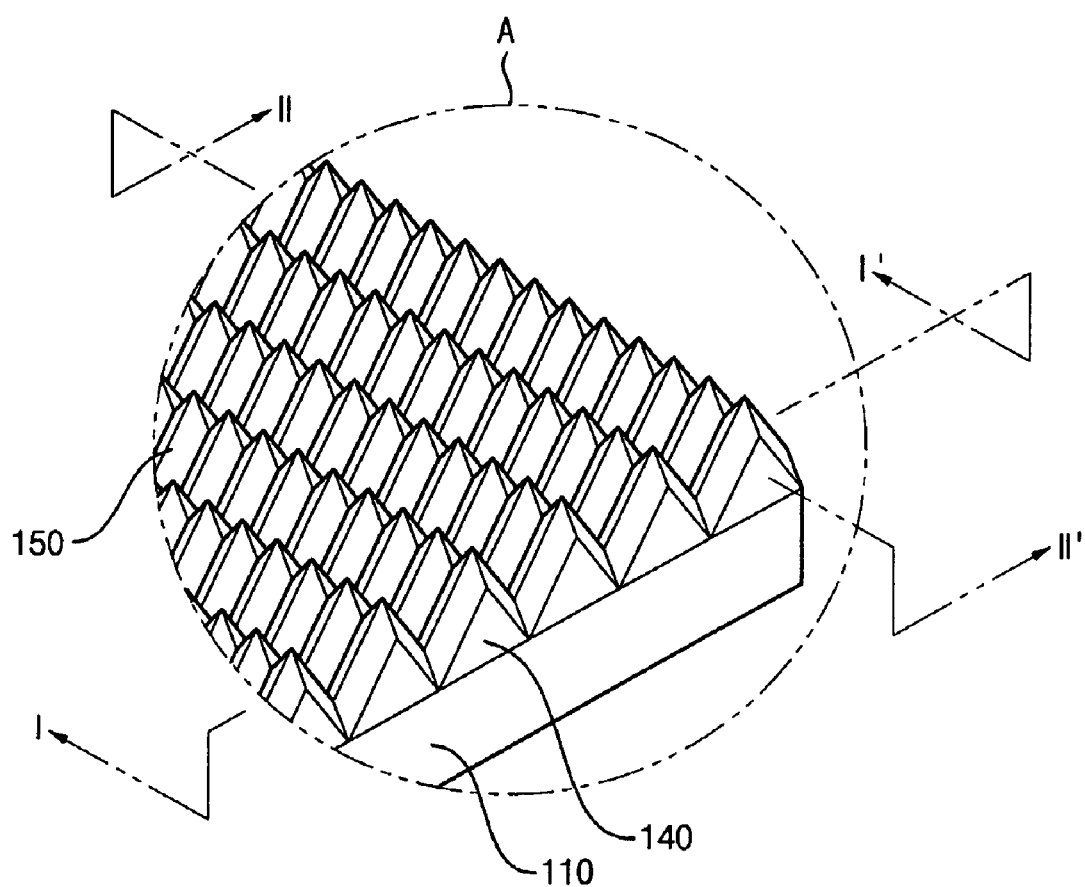
FIG. 2 is an enlarged perspective view showing a portion 'A' in FIG. 1.
Figure 2:
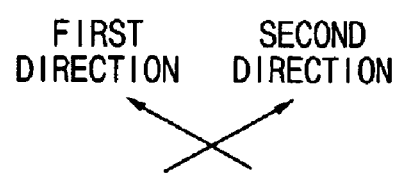

FIG. 1 is a perspective view showing a light-condensing member according to an example embodiment of the present invention, and FIG. 2 is an enlarged perspective view showing a portion 'A' in FIG. 1.

Referring to FIGS. 1 and 2, a light-condensing member 100 according to an example embodiment of the present invention includes a base plate 110, a main light-condensing pattern 120 formed on the base plate 110, and a sub light-condensing pattern 130 formed on the main light-condensing pattern 120.

The main light-condensing pattern 120 is formed on a whole upper portion of the base plate 110 to condense light passing through the light-condensing member 100 into a vertical direction.

The main light-condensing pattern 120 includes a plurality of main prisms 140 connected with each other. The main prisms 140 are extended in a first direction. Each of the main prisms 140 has a trigonal prism shape. Therefore, light advancing at an incline in a second direction substantially perpendicular to the first direction, is condensed into a vertical direction through the main prisms 140, and then exits in the vertical direction.

The sub light-condensing pattern 130 is formed on an entire upper portion of the main light-condensing pattern 120 to condense light passing through the light-condensing member 100 into a vertical direction.

The sub light-condensing pattern 130 includes a plurality of sub prisms 150 connected to each other. The sub prisms 150 are extended in the second direction substantially perpendicular to the first direction. Each of the sub prisms 150 has a shape of a trigonal prism. Therefore, light advancing at an incline in the first direction is condensed into a vertical direction through the sub prisms 150, and then exits in the vertical direction.

The light-condensing member 100 includes a transparent resinous material. For instance, the light-condensing member 100 includes polymethyl methacrylate (PMMA). Alternatively, the light-condensing member 100 may include polycarbonate (PC) or polyethylene terephthalate (PET).

Figure 3:
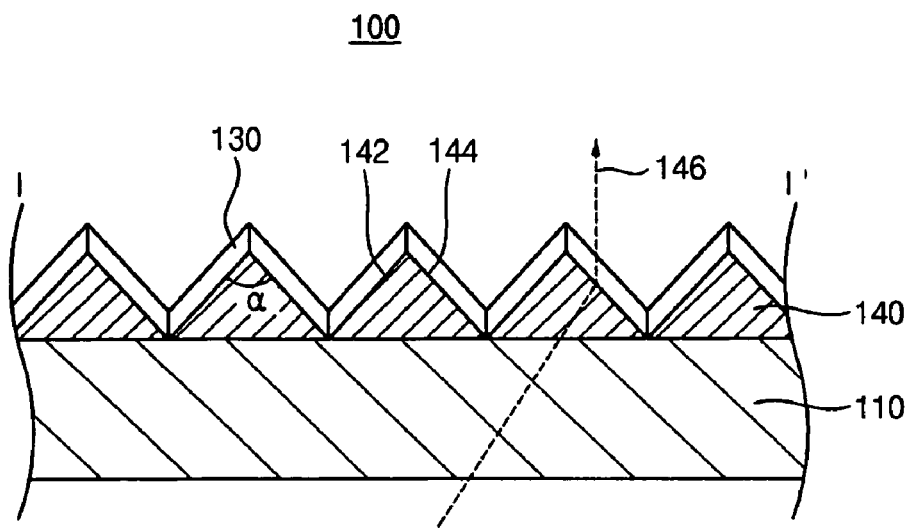
FIG. 3 is a cross-sectional view taken along a line I-I' in FIG. 2.

FIG. 3 is a cross-sectional view taken along a line I-I' in FIG. 2.

Referring to FIGS. 2 and 3, a cross section of the main prism 140 taken along the second direction substantially perpendicular to the first direction has a substantially triangular shape.

The main prism 140 includes a first sloping surface 142 and a second sloping surface 144 protruding from the base plate 110, so that the first sloping surface 142, the second sloping surface 144 and an upper face of the base plate 110 define a triangular shape.

A vertical angle $\alpha$ of the main prism 140, namely an interior angle between the first sloping surface 142 and the second sloping surface 144, ranges from about 60 degrees to about 150 degrees. For instance, the vertical angle $\alpha$ of the main prism 140 is about 90 degrees.

Light 146 advancing at an incline in the second direction is refracted at the first sloping surface 142 or the second sloping surface 144 of the main prism 140, and then exits in a vertical direction.

The sub light-condensing pattern 130 is formed at the first sloping surface 142 and the second sloping surface 144 of the main prisms 140.

Figure 4:
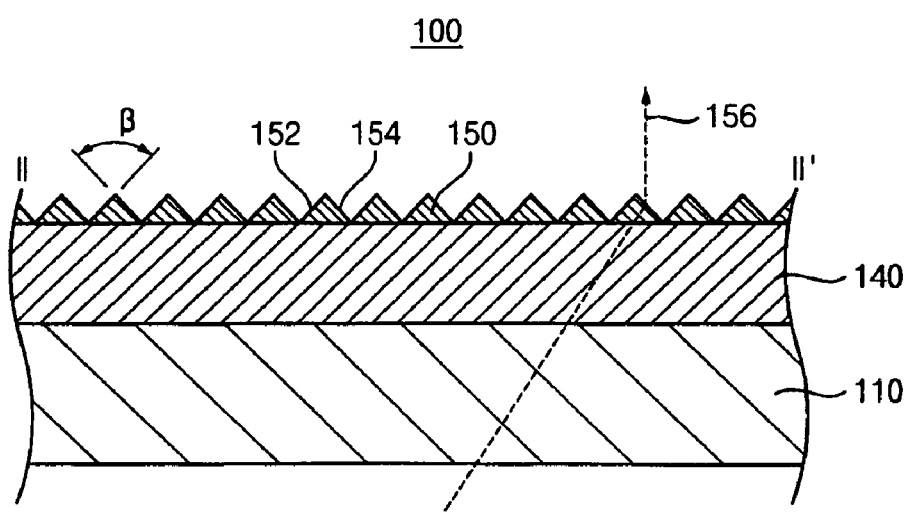
FIG. 4 is a cross-sectional view taken along a line II-II' in FIG. 2.

FIG. 4 is a cross-sectional view taken along a line II-II' in FIG. 2.

Referring to FIGS. 2 and 4, a cross section of the sub prism 150 taken along the first direction substantially perpendicular to the second direction has a substantially triangular shape.

The sub prism 150 includes a third sloping surface 152 and a fourth sloping surface 154 protruding from the main prisms 140, so that the third sloping surface 152, the fourth sloping surface 154 and the upper portion of the main prisms 140 define a triangular shape.

A vertical angle $\beta$ of the sub prism 150, namely an interior angle between the third sloping surface 152 and the fourth sloping surface 154, ranges from about 60 degrees to about 150 degrees. For instance, the vertical angle $\beta$ of the sub prism 150 is about 90 degrees.

Light 156 advancing at an incline in the first direction is refracted at the third sloping surface 152 or the fourth sloping surface 154 of the sub prism 150, and then exits in a vertical direction.

Therefore, the light-condensing member 100 simultaneously condenses both the light 146 advancing at an incline in the second direction and the light 156 advancing at an incline in the first direction into a vertical direction through the main light-condensing pattern 120 and the sub light-condensing pattern 130.

The light-condensing member 100 may further include a diffusing layer disposed on a bottom surface of the base plate 110. The diffusing layer (not illustrated) diffuses light entering the light-condensing member 100 to improve brightness uniformity. The diffusing layer includes a plurality of diffusing beads having a predetermined particle size. For instance, the diffusing beads range in particle size from about 5 μm to about 10 μm. The diffusing beads are fixed on a bottom surface of the base plate 110 through ultraviolet-hardening resin hardened by ultraviolet light.

Figure 5:
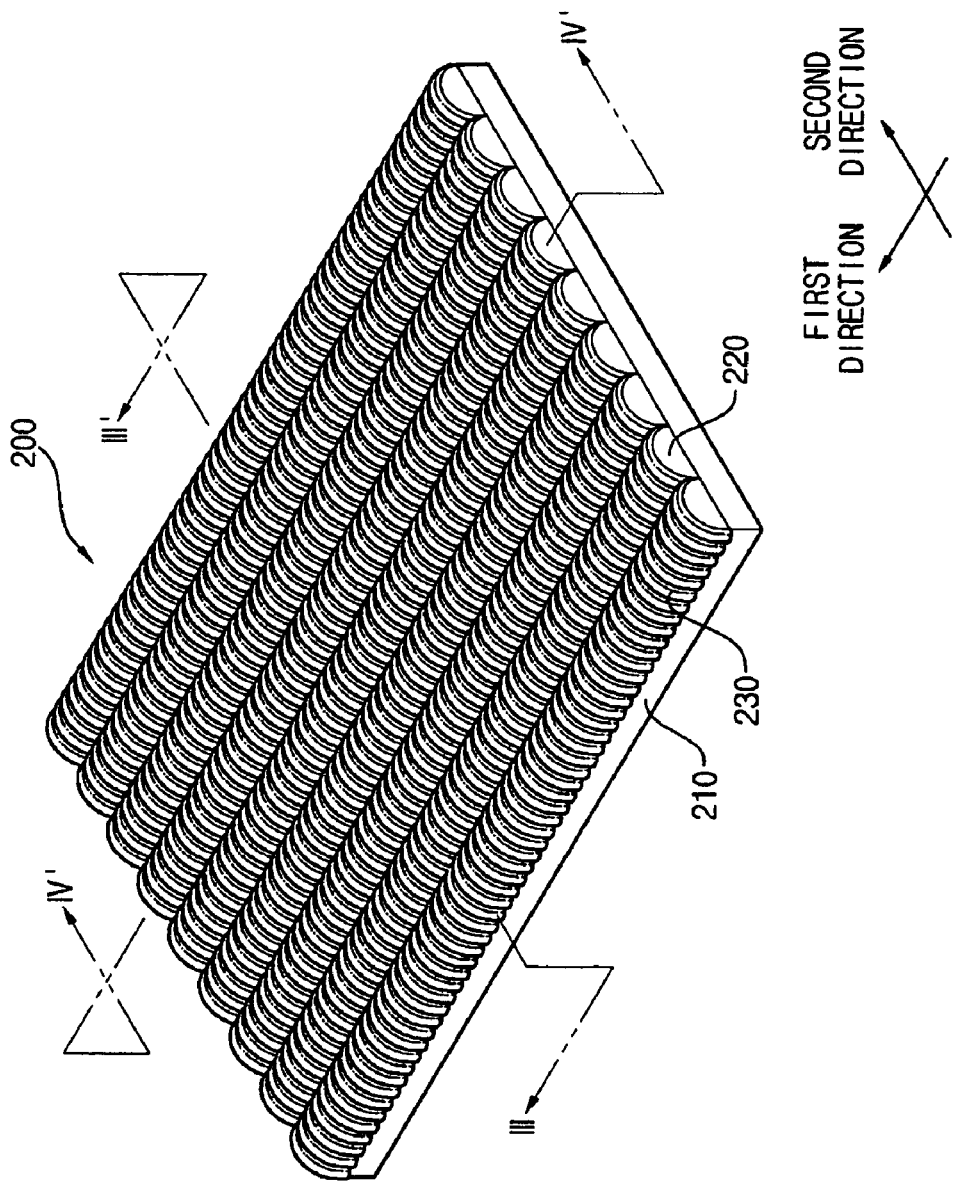
FIG. 5 is a perspective view showing a light-condensing member according to an example embodiment of the present invention.
Figure 6:
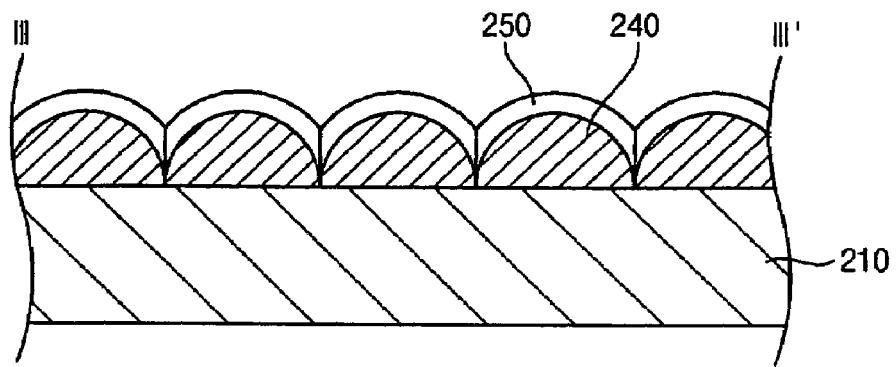
FIG. 6 is a cross-sectional view taken along a line III-III' in FIG. 5.
Figure 7:
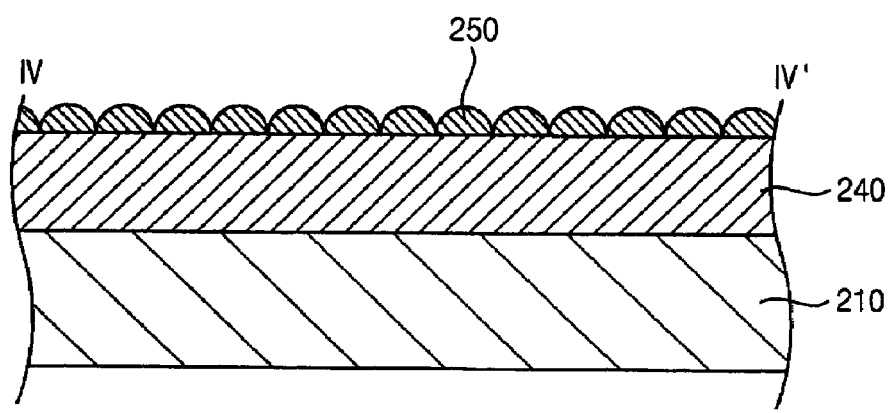
FIG. 7 is a cross-sectional view taken along a line IV-IV' in FIG. 5.

FIG. 5 is a perspective view showing a light-condensing member according to an example embodiment of the present invention, FIG. 6 is a cross-sectional view taken along a line III-III' in FIG. 5, and FIG. 7 is a cross-sectional view taken along a line IV-IV' in FIG. 5.

Referring to FIGS. 5, 6 and 7, a light-condensing member 200 according to an example embodiment of the present invention includes a base plate 210, a main light-condensing pattern 220 formed on the base plate 210, and a sub light-condensing pattern 230 formed on the main light-condensing pattern 220.

The main light-condensing pattern 220 includes a plurality of main prisms 240 connected with each other. The main prisms 240 are extended in a first direction.

A cross section of the main prism 240, taken along the second direction substantially perpendicular to the first direction, has a substantially semi-circular or semi-elliptic shape.

Light advancing at an incline in the second direction is refracted to an outside surface of the main prism 240, and then exits in a vertical direction.

The sub light-condensing pattern 230 is formed on an outside surface of the main prisms 240. The sub light-condensing pattern 230 includes a plurality of sub prisms 250 connected each other. The sub prisms 250 are extended in a second direction substantially perpendicular to the first direction.

A cross section of the sub prism 250, taken along the first direction substantially perpendicular to the second direction, has a substantially semi-circular or semi-elliptic shape.

Light advancing at an incline in the first direction is refracted to an outside surface of the sub prism 250, and then exits in a vertical direction.

Therefore, the light-condensing member 200 condenses both the light advancing at an incline in the first direction and the second direction simultaneously into a vertical direction through the main light-condensing pattern 220 and the sub light-condensing pattern 230.

In alternative embodiments, a cross section of the main prism may have a substantially triangular shape and a cross section of the sub prism may have a substantially semi-circular or semi-elliptic form, or a cross section of the main prism may have a substantially semi-circular or semi-elliptic shape and a cross section of the sub prism may have a substantially triangular shape.

Hereinafter, a method of manufacturing a light-condensing member according to an example embodiment of the present invention will be explained in detail with reference to FIGS. 8 to 12.

FIGS. 8 to 12 are views for showing a process of manufacturing the light-condensing member.

Figure 8:
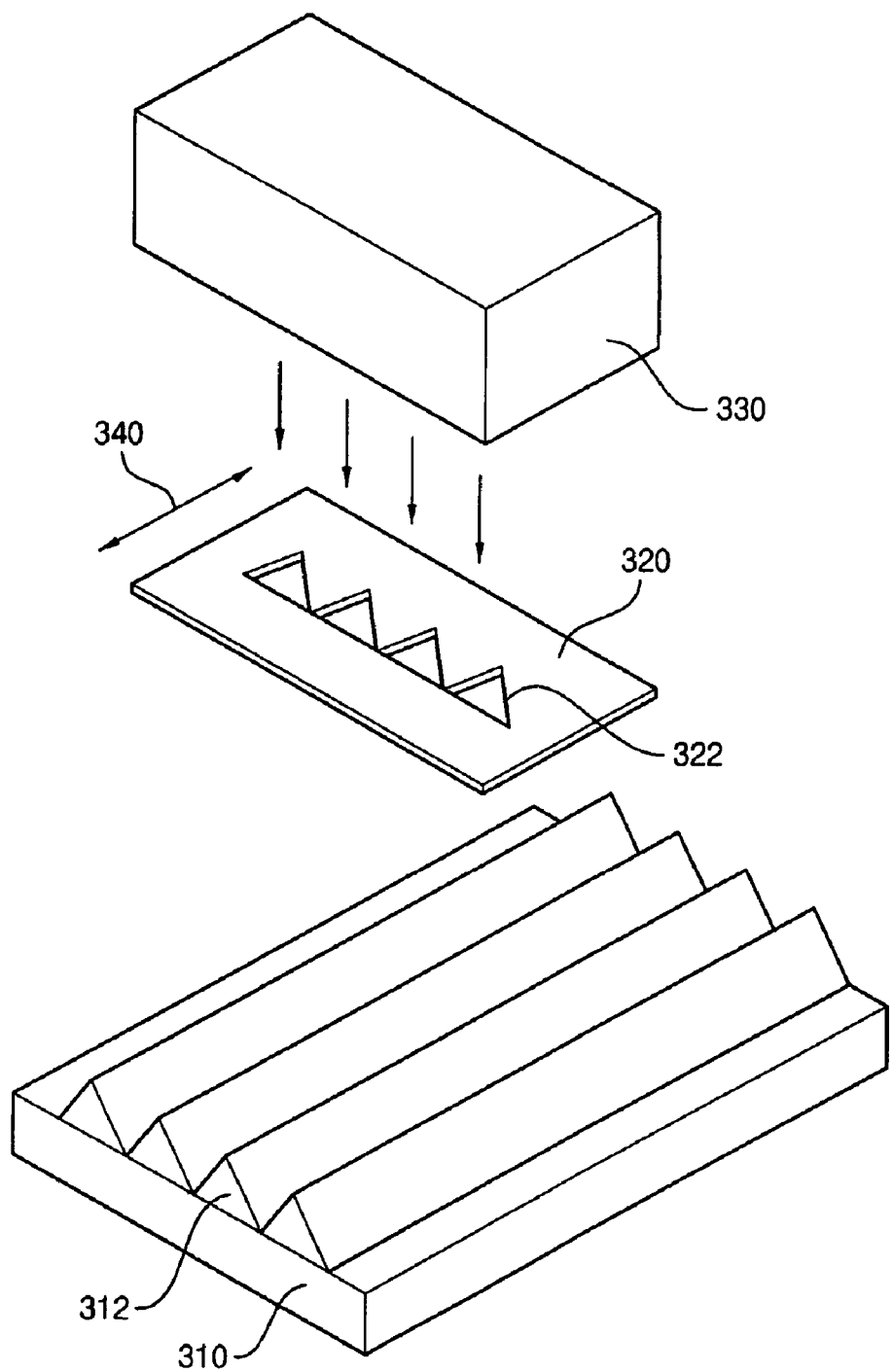
FIGS. 8 to 12 are views for showing a process of manufacturing a light-condensing member according to an example embodiment of the present invention.

Referring to FIG. 8, a shape corresponding to a main light-condensing pattern 312 is formed on a base plate 310 including a resinous material through a laser-process using a first mask 320. The main light-condensing pattern 312 includes the resinous material.

The first mask 320 includes a first opening pattern 322 for transmitting a laser beam radiated from a laser generator 330 toward the base plate 310. The first opening pattern 322 has a shape substantially the same as a cross section of the main light-condensing pattern 312. For instance, the first opening pattern 322 has a triangular shape. Alternatively, the first opening pattern 322 may have a semi-circle shape or a semi-ellipse shape.

When the first mask 320 or the base plate 310 moves along a direction 340 corresponding to a longitudinal direction of the main light-condensing pattern 312, exposure times for which the base plate 310 is exposed to the laser beam through the first opening pattern 322 are different from one another based on the position of the first mask 320 or the base plate 310. Accordingly, shapes corresponding to the main light-condensing pattern 312 are formed on the base plate 310.

Figure 9:
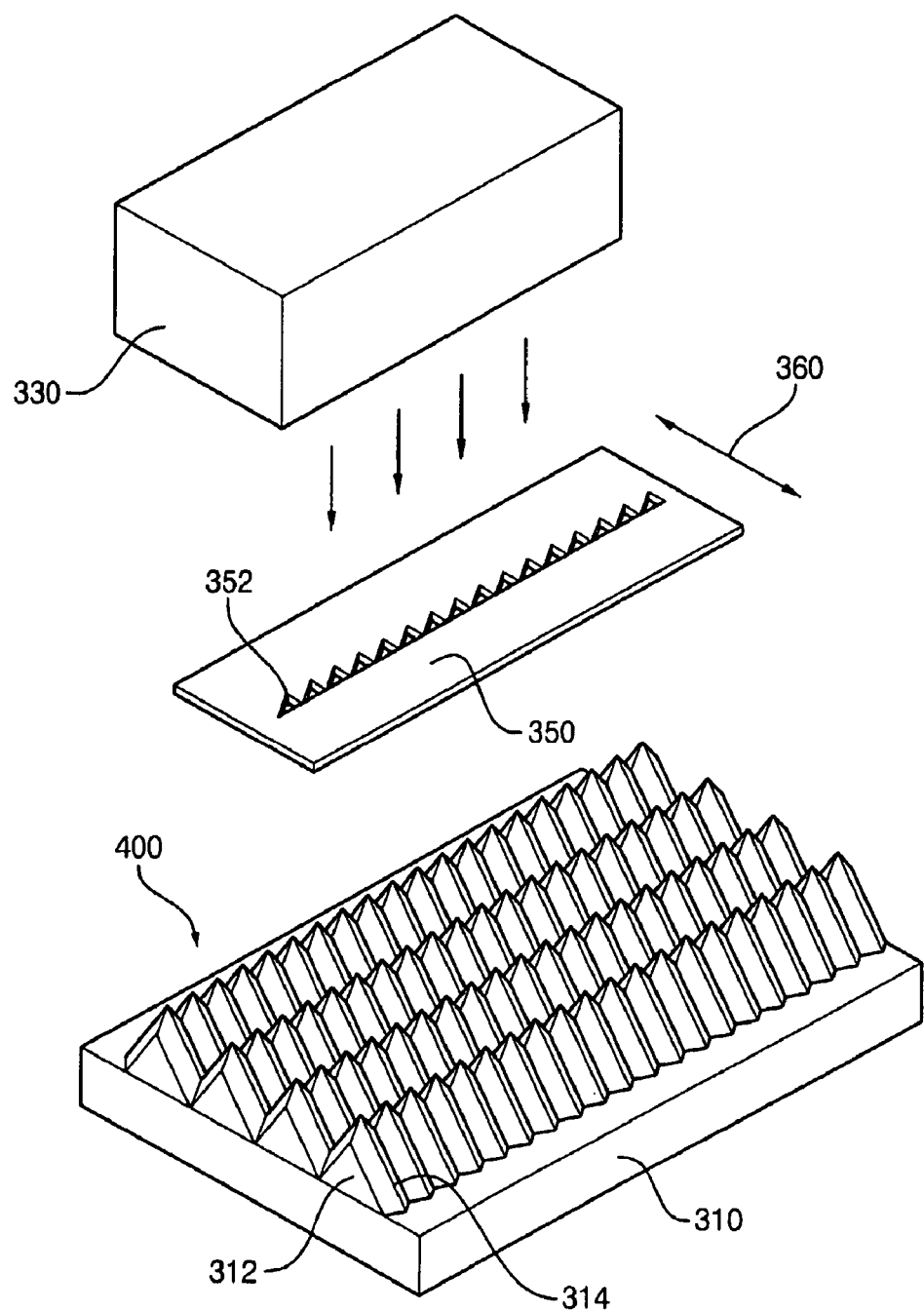

Referring to FIG. 9, a shape corresponding to a sub light-condensing pattern 314 is formed on the base plate 310, on which a shape corresponding to a main light-condensing pattern 312 has been formed. The shape corresponding to a sub light-condensing pattern 314 is formed through a laser-process using a second mask 350.

The second mask 350 includes a second opening pattern 352 for transmitting a laser beam radiated from the laser generator 330 toward the base plate 310. The second opening pattern 352 has a shape substantially the same as a cross section of the sub light-condensing pattern 314. For instance, the second opening pattern 352 has a triangular shape. Alternatively, the second opening pattern 352 may have a shape of semi-circle or semi-ellipse.

When the second mask 350 or the base plate 310 moves along a direction 360 corresponding to a longitudinal direction of the sub light-condensing pattern 314, exposure times for which the base plate 310 is exposed to the laser beam through the second opening pattern 352 are different from one another based on the position of the second mask 350 or the base plate 310. Accordingly, a shape corresponding to the sub light-condensing pattern 314 is formed on the base plate 310.

Alternatively, a shape corresponding to the main light-condensing pattern 312 and the sub light-condensing pattern 314 may be formed through a process of ultraviolet ray lithography or X-ray lithography instead of the laser-process.

As described above, when shapes corresponding to the main light-condensing pattern 312 and the sub light-condensing pattern 314 have been formed, manufacture of a master mold 400 is completed.

Figure 10:
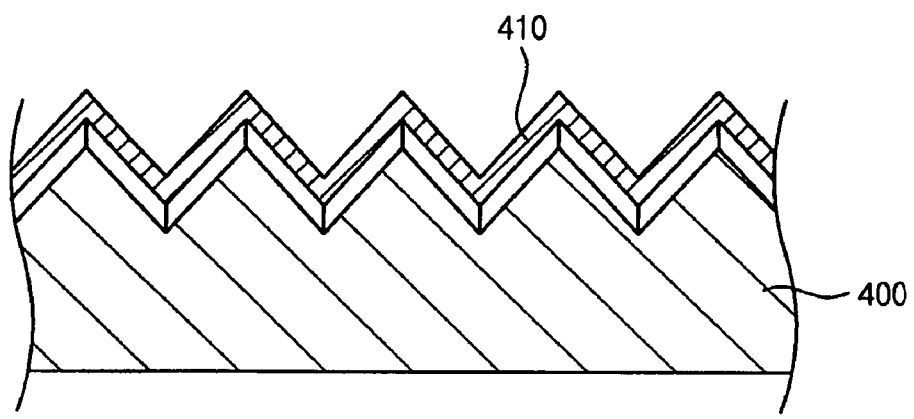

Referring to FIG. 10, the master mold 400 having a shape corresponding to the main light-condensing pattern 312 and the sub light-condensing pattern 314 is coated with a release agent 410 for electroplating.

Figure 11:
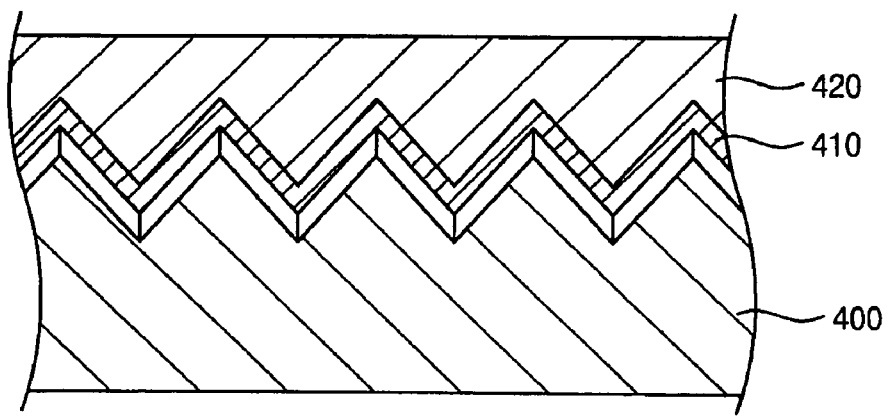

Referring to FIG. 11, a stamper 420 may be manufactured by electroplating nickel (Ni) on the master mold 400 that is coated with the release agent 410.

Figure 12:
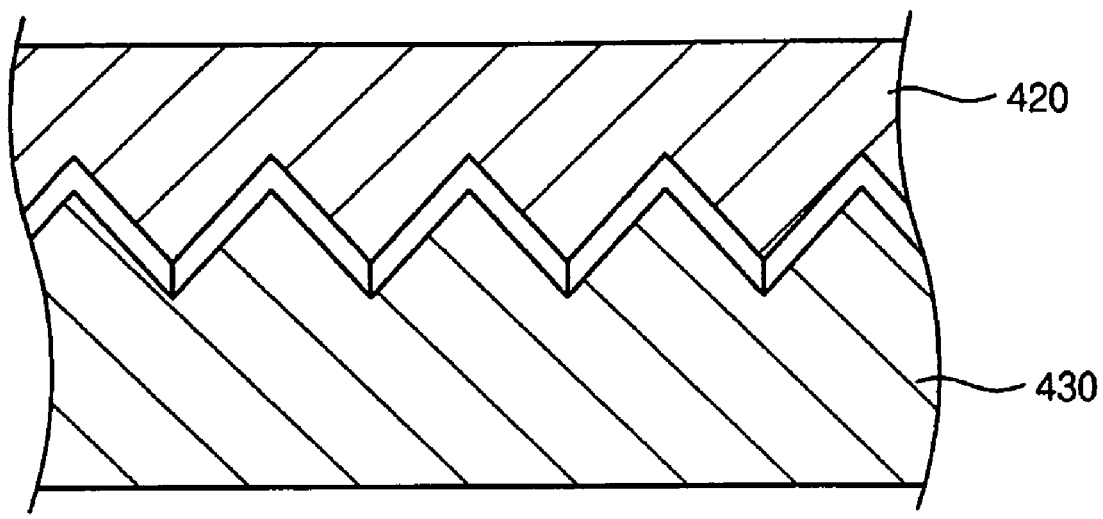

Referring to FIG. 12, a light-condensing member 430 is manufactured on a base plate including a resinous material through a process of stamping using the stamper 420. The light-condensing member 430 includes, for instance, polymethyl methacrylate (PMMA).

Figure 13:
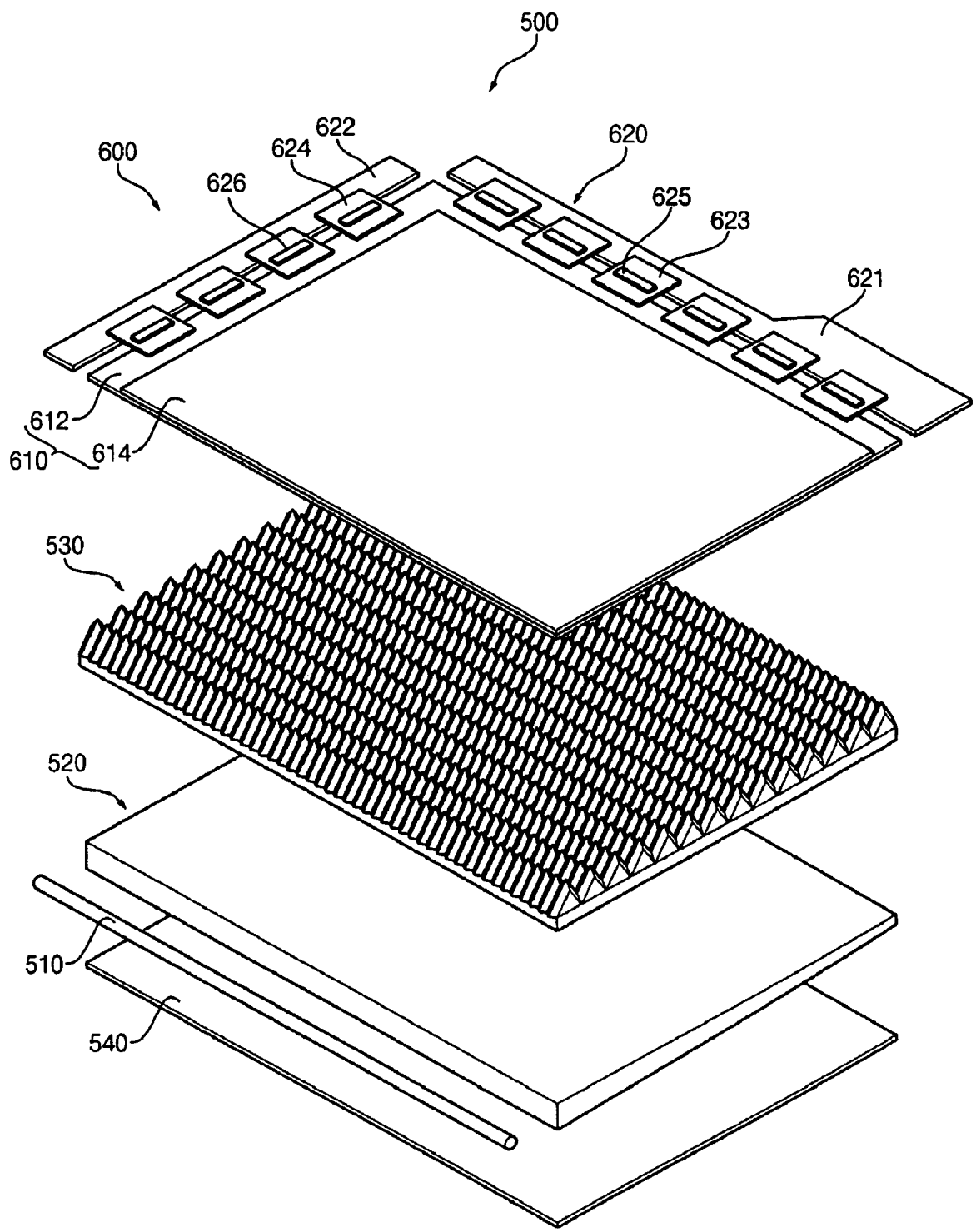
FIG. 13 is an exploded perspective view showing a display apparatus according to an example embodiment of the present invention.

FIG. 13 is an exploded perspective view showing a display apparatus according to an example embodiment of the present invention.

Referring to FIG. 13, a display apparatus 500 according to an example embodiment of the present invention includes a lamp 510, a light guide plate 520, a light-condensing member 530, and a display unit 600.

The lamp 510 is disposed at a side portion of the light guide plate 520. The lamp 510 receives power applied from an external inverter (not illustrated), and emits light. The lamp 510 is, for instance, a cold cathode fluorescent lamp (CCFL) that has a thin and long cylinder shape. Alternatively, the lamp 510 may be an external electrode fluorescent lamp (EEFL)

formed on a surface of the light guide plate 520, which includes electrodes formed thereon.

The display apparatus 500 may further include a lamp cover (not shown) wrapping portions of the lamp 510 to protect the lamp 510. The lamp cover includes, for example, a material having high reflectivity, or an inside surface of the lamp cover is coated with a material having high reflectivity. The lamp cover reflects light generated by the lamp 510 toward the light guide plate 520 to improve an optical efficiency.

The light guide plate 520 guides light, which is provided from the lamp 510 disposed at a side portion of the light guide plate 520, toward an upper part. The light guide plate 520 includes a transparent material to guide light. For instance, the light guide plate 520 includes polymethyl methacrylate (PMMA).

On a bottom surface of the light guide plate 520, a diffusing pattern (not illustrated) is formed to reflect and diffuse light. For instance, the diffusing pattern may be a printed pattern or a convex-and-concave pattern. The light, which is provided from the lamp 510 and enters the light guide plate 520, is reflected and diffused by the diffusing pattern, and light meeting a specific condition exits from the light guide plate 520 through an upper surface of the light guide plate 520.

The light-condensing member 530 is disposed over the light guide plate 520. The light-condensing member 530 condenses light simultaneously in a first direction corresponding to a longitudinal direction of the lamp 510 and in a second direction substantially perpendicular to the longitudinal direction of the lamp 510, and then emits the light into the display unit 600. The light-condensing member 530 has substantially the same structure as the light condensing members 100 or 200 shown in FIGS. 1 to 7.

The display apparatus 500 may further include a reflecting sheet 540. The reflecting sheet 540 reflects light leaking out through a bottom of the light guide plate 520, so that the leaked light may be advanced toward the light guide plate 520. The reflecting sheet 540 includes, for example, a material having high reflectivity. For instance, the reflecting sheet 540 includes white polyethylene terephthalate (PET), or white polycarbonate (PC).

The display unit 600 includes a liquid crystal display panel 610 using condensed light to display an image, and a driving circuit part 620 to drive the liquid crystal display panel 610.

The liquid crystal display panel 610 includes a first substrate 612, and a second substrate 614 combined with the first substrate 612. The first and second substrates 612, 614 face each other. A liquid crystal layer (not illustrated) is interposed between the first and second substrates 612 and 614.

The first substrate 612 may be a thin film transistor (hereinafter called 'TFT') substrate on which a plurality of TFTs, which are switching elements, are arranged in a matrix-shape. For instance, the first substrate 612 includes a transparent material to transmit light. A source terminal and a gate terminal of a TFT are electrically connected to a data line and a gate line respectively, and a drain terminal is electrically connected to a pixel electrode comprising a transparent and conductive material.

The second substrate 614 may be a color filter substrate on which RGB pixels are formed as a thin film to display colors. For instance, the first substrate 612 includes a transparent material. A common electrode including a transparent and conductive material is formed on the second substrate 614.

In the liquid crystal display panel 610 having this composition, when power is applied to the gate terminal of a TFT and the TFT turns on, an electric field is generated between the pixel electrode and the common electrode. According to this electric field, an alignment of liquid crystal molecules of the liquid crystal layer, interposed between the first substrate 612 and the second substrate 614, is changed. Then, according to the changed alignment of the liquid crystal molecules, the optical transmittance of light provided from the light-condensing member 530 is changed to display an image having a predetermined gradation.

The driving circuit part 620 includes a data printed-circuit-board 621 to provide the liquid crystal display panel 610 with data driving-signals, a gate printed-circuit-board 622 to provide the liquid crystal display panel 610 with gate driving-signals, a data driving-circuit film 623 to connect the data printed-circuit-board 621 to the liquid crystal display panel 610, and a gate driving-circuit film 624 to connect the gate printed-circuit-board 622 to the liquid crystal display panel 610.

The data driving-circuit film 623 and the gate driving-circuit film 624 include a data driving chip 625 and a gate driving chip 626, respectively. The data driving-circuit film 623 and the gate driving-circuit film 624 include, for instance, tape carrier package (TCP) or chip on film (COF).

Meanwhile, the gate printed-circuit-board 622 may be omitted by, instead, forming another signal wiring on the liquid crystal display panel 610 and the gate driving-circuit film 624.

The display apparatus 500 may further include a diffusing sheet (not shown) disposed at a lower or an upper part of the light-condensing member 530. The diffusing sheet diffuses light, which is incident from the light guide plate 520 or the light-condensing member 530, to improve brightness uniformity.

Figure 14:
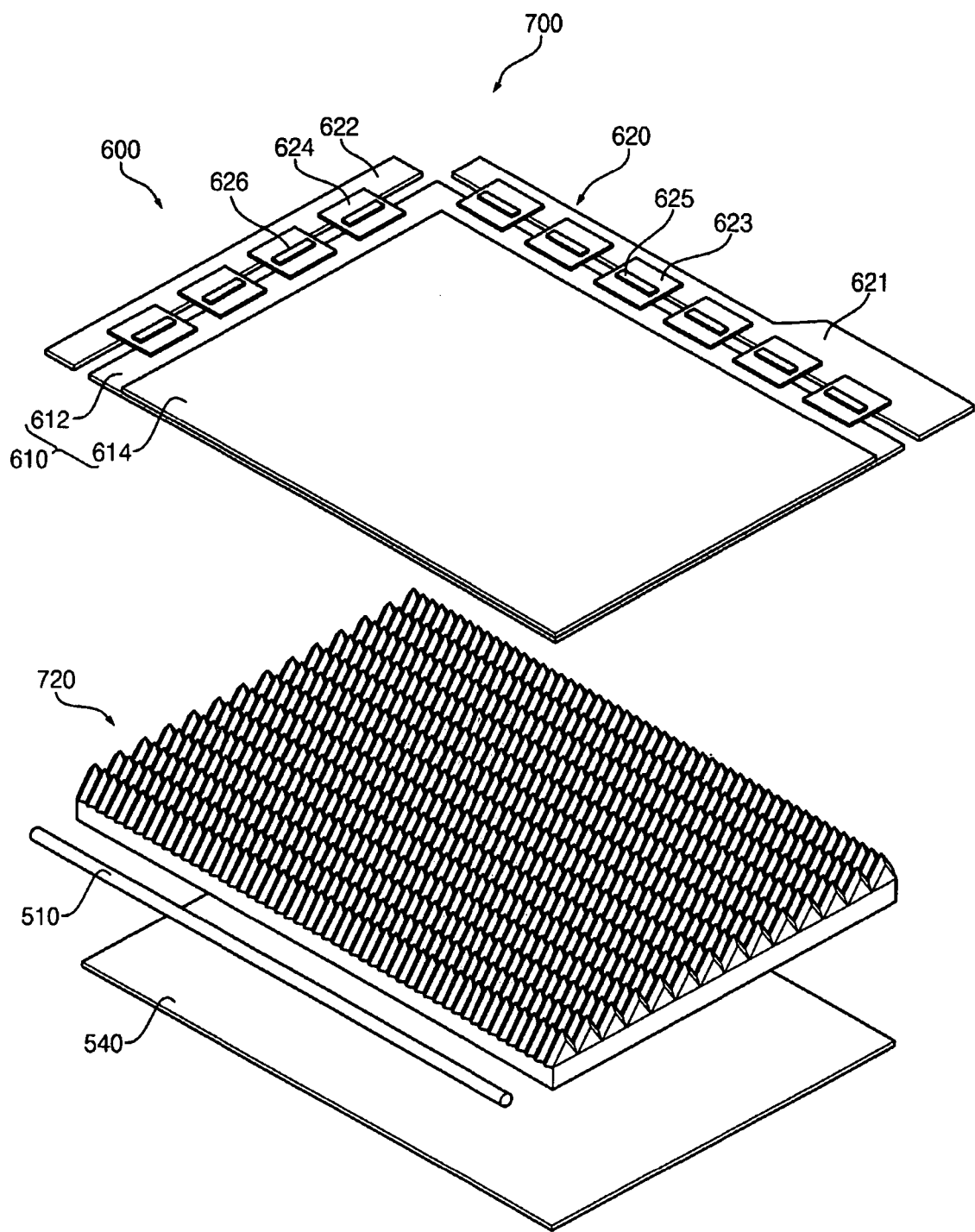
FIG. 14 is an exploded perspective view showing a display apparatus according to an example embodiment of the present invention.

FIG. 14 is an exploded perspective view showing a display apparatus according to another example embodiment of the present invention.

Referring to FIG. 14, a display apparatus 700 according to an example embodiment of the present invention includes a lamp 510 emitting light, a light-condensing member 720 to condense and emit light provided from the lamp 510 into an upper part, a reflecting sheet 540 disposed at a lower part of the light-condensing member 720, and a display unit 600 disposed at an upper part of the light-condensing member 720 to display an image.

The lamp 510, the reflecting sheet 540, and the display unit 600 are substantially the same as those shown in FIG. 13.

The light-condensing member 720 functions simultaneously as both a light guide plate and a light condensing member. For example, the light condensing member 720 functions as the light guide plate 520 and the light-condensing member 530. The base plate of the light-condensing member 720 has substantially the same thickness as the light guide plate 520. A main light-condensing pattern and a sub light-condensing pattern, which are substantially the same as those shown in FIG. 1, are formed on an upper surface of the light-condensing member 720.

Since the light-condensing member 720 functions simultaneously as a light-guiding member and a light-condensing member, separate light guiding and light-condensing members are not necessary.

According to the above-mentioned exemplary embodiments of the present invention including the light-condensing members, methods of manufacturing the light-condensing members, and the display apparatuses having the light-condensing members, light is condensed simultaneously in both a direction parallel with a lamp and a direction perpendicular to the lamp. Therefore, the number of parts and manufacturing costs are reduced. Also, a thickness of products is reduced.

Having described the example embodiments of the present invention, it is noted that various changes, substitutions and alterations can be made herein without departing from the spirit and scope of the invention as defined by the appended claims.

What is claimed is:

1. A light-condensing member comprising:
   a base plate;
   a main light-condensing pattern formed on the base plate; and
   a sub light-condensing pattern formed on the main light-condensing pattern, wherein the main light-condensing pattern includes a main prism which has a lower surface making contact with the base plate, the lower surface having a length in a first direction and a width in a second direction substantially perpendicular to the first direction, the width being smaller than the length and parallel to a base of a cross sectional shape of the main prism, wherein the cross section is taken along the second direction, and the sub light-condensing pattern includes a plurality of sub prisms formed on a surface of the main prism, each of the plurality of sub prisms including two surfaces making contact with each other along a first line which is substantially perpendicular to the first direction.

2. The light-condensing member of claim 1, wherein the cross section of the main prism taken along the second direction substantially perpendicular to the first direction has a substantially triangular shape.

3. The light-condensing member of claim 2, wherein a vertical angle of the main prism ranges from about 60 degrees to about 150 degrees.

4. The light-condensing member of claim 3, wherein the vertical angle of the main prism is about 90 degrees.

5. The light-condensing member of claim 1, wherein the cross section of the main prism taken along the second direction substantially perpendicular to the first direction has one of a substantially semi-circular shape or a substantially semi-elliptic shape.

6. The light-condensing member of claim 1, wherein a cross section of a sub prism taken along the first direction has a substantially triangular shape.

7. The light-condensing member of claim 6, wherein a vertical angle of the sub prism ranges from about 60 degrees to about 150 degrees.

8. The light-condensing member of claim 1, wherein a cross section of a sub prism taken along the first direction has one of a substantially semi-circular shape or a substantially semi-elliptic shape.

9. The light-condensing member of claim 1, wherein:
   a main prism includes a first sloping surface and a second sloping surface upwardly protruding from the base plate to constitute a triangular shape; and
   the sub light-condensing pattern is formed on each of the first sloping and the second sloping surfaces.

10. The light-condensing member of claim 1, further comprising a diffusing layer formed on a bottom surface of the base plate.

11. The light-condensing member of claim 10, wherein the diffusing layer includes a plurality of diffusing beads having a predetermined particle size.

12. A display apparatus comprising:
    a lamp emitting light;
    a light guide plate guiding the light, toward an upper part of the display apparatus, wherein the lamp is disposed at a side portion of the light guide plate;
    a light-condensing member disposed over the light guide plate to condense light exiting from the light guide plate; and
    a display unit disposed over the light-condensing member to display an image using the condensed light;
    wherein the light-condensing member includes:
       a base plate;
       a main light-condensing pattern formed on the base plate; and
       a sub light-condensing pattern formed on the main light-condensing pattern, wherein:
          the main light-condensing pattern includes a main prism which has a lower surface making contact with the base plate, the lower surface having a length in a first direction and a width in a second direction substantially perpendicular to the first direction, the width being smaller than the length and parallel to a base of a cross sectional shape of the main prism, wherein the cross section is taken along the second direction; and
          the sub light-condensing pattern includes a plurality of sub prisms formed on a surface of the main prism, each of the plurality of sub prisms including two surfaces making contact with each other along a first line which is substantially perpendicular to the first direction.

13. A display apparatus comprising:
    a lamp emitting light;
    a light-condensing member to condense and emit the light provided from the lamp, wherein the lamp is disposed at a side portion of the light-condensing member; and
    a display unit disposed over the light-condensing member to display an image using the condensed light;
    wherein the light-condensing member includes:
       a base plate;
       a main light-condensing pattern formed on the base plate; and
       a sub light-condensing pattern formed on the main light-condensing pattern, wherein:
          the main light-condensing pattern includes a main prism which has a lower surface making contact with the base plate, the lower surface having a length in a first direction and a width in a second direction substantially perpendicular to the first direction, the width being smaller than the length and parallel to a base of a cross sectional shape of the main prism, wherein the cross section is taken along the second direction; and
          the sub light-condensing pattern includes a plurality of sub prisms formed on a surface of the main prism, each of the plurality of sub prisms including two surfaces making contact with each other along a first line which is substantially perpendicular to the first direction.

* * * * *